United States Patent [19]

Della-Calce

[11] 4,180,316
[45] Dec. 25, 1979

[54] LOW NOISE AUTOMATIC CAMERA ADVANCE MECHANISM

[75] Inventor: Louis D. Della-Calce, Phoenix, Ariz.

[73] Assignee: Crimeye Inc., Phoenix, Ariz.

[21] Appl. No.: 903,802

[22] Filed: May 8, 1978

[51] Int. Cl.² .............................................. G03B 1/12
[52] U.S. Cl. .................................... 354/173; 354/81; 354/266
[58] Field of Search ....................... 354/64, 65, 67, 75, 354/76, 81, 131, 170, 171, 173, 204, 212, 266, 267, 269, 295; 352/84, 121, 137

[56] References Cited

U.S. PATENT DOCUMENTS

| | | | |
|---|---|---|---|
| 2,944,474 | 7/1960 | Dennis | 354/64 |
| 3,309,976 | 3/1967 | Reiss | 354/266 |
| 3,391,623 | 7/1968 | Tabankin | 354/76 |
| 3,672,269 | 6/1972 | Tabankin | 354/75 |

FOREIGN PATENT DOCUMENTS

| | | | |
|---|---|---|---|
| 86190 | 11/1965 | France | 354/173 |
| 159399 | 12/1962 | U.S.S.R. | 354/67 |

*Primary Examiner*—John Gonzales
*Attorney, Agent, or Firm*—Cahill, Sutton & Thomas

[57] ABSTRACT

A protective photographic system includng a low cost still camera mounted in a concealing enclosure and having a mechanism driven by an electric motor unit for automatically advancing a film winding lever of the camera and depressing an exposure button of the camera at a predetermined rate in response to a control unit electrically connected to the electric motor unit. The mechanism is mounted on an exposure button collar rigidly attached to a surface of the camera. The mechanism includes a reciprocating plate having a perpendicularly extending member for engaging the film winding lever. The reciprocating member rotates counterclockwise through an angle sufficient to advance the film winding lever to a predetermined position and then rotates counterclockwise to allow the film winding lever to return to an initial position. The rotation of the reciprocating member in the counterclockwise and clockwise directions occurs in response to a rotating crank member coupled to a rotating shaft of the electric motor unit. A button depressing member depresses the exposure button during predetermined portion of the counterclockwise rotation.

10 Claims, 7 Drawing Figures

U.S. Patent    Dec. 25, 1979    4,180,316
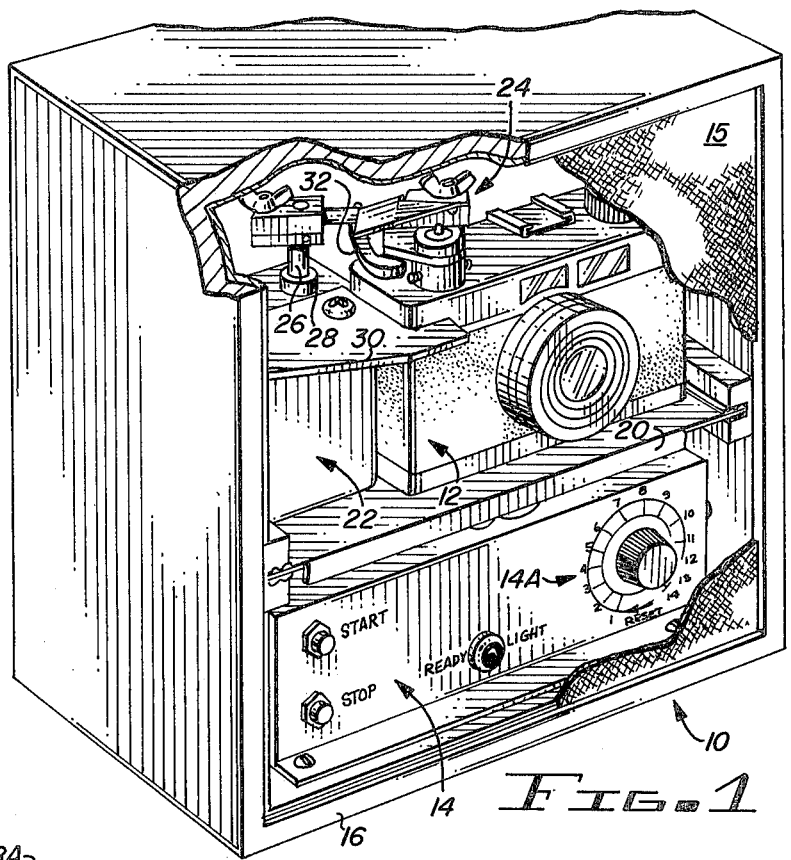
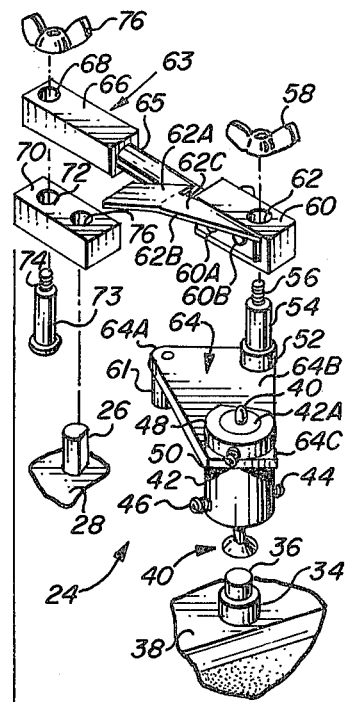
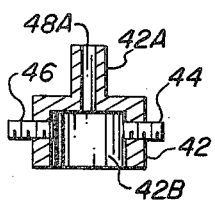
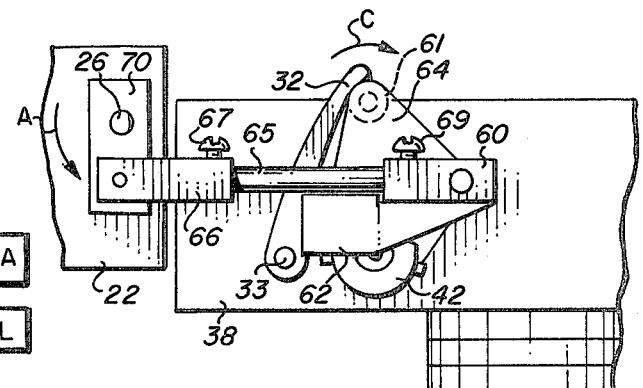
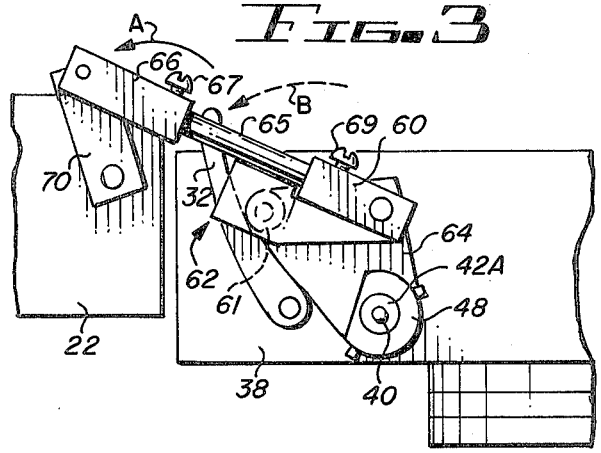
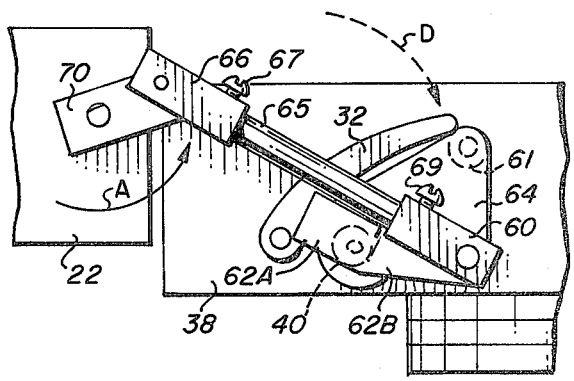

LOW NOISE AUTOMATIC CAMERA ADVANCE MECHANISM

BACKGROUND OF THE INVENTION

1. Field of the Invention

The invention relates to motor-driven mechanisms for repetitively advancing the film and actuating exposure buttons of concealed cameras to produce timed sequences of photos.

2. Description of the Prior Art

Various industrial security systems and the like have been utilized to detect unauthorized entry into a restricted area to monitor or record unauthorized or criminal activities by persons making such unauthorized entry. Such systems have included expensive television cameras and a variety of expensive cameras with sophisticated and expensive mechanisms for making a timed sequence of photos in response to a control signal triggered by a mechanism detecting the unauthorized entry or any a remote transmitter signal initiated by someone observing the unauthorized entry or activity. The state of the art is generally indicated by U.S. Pat. Nos. 3,117,314; 3,391,623; 4,054,752; 3,858,223; 3,821,760; 3,739,698; 3,594,747 and 3,391,624. However, none of these patents disclose particular details of any motor-driven external mechanisms for sequentially activating an exposure button and film winding lever of a camera. Various apparatus including concealed cameras with mecahnisms for advancing the film and activating the exposure buttons have been utilized in conjunction with security systems. One system utilizes a low cost camera known as the "Great Wall" camera, made in China. The "Great Wall" camera can be wound up by hand so that the film automatically advances every time the exposure button is activated. However, the camera makes a great deal of noise as it advances the film automatically. This noise is sufficiently great that it is not adequately muffled even by insulation provided in a concealing enclosure, and thus can alert the persons being photographed. It is, of course, desirable that criminals or unauthorized persons being photographed not to be alerted to the fact that they are being photographed. This may be crucial to the safety of a person, such as a liquor store employee who initiates the operation of the surveillance camera during an armed robbery.

Various cameras which are much more expensive than the "Great Wall" camera have the capability of being connected to battery powered units which can be connected to such cameras to automatically advance the film and operate the exposure control to produce a timed sequence of photos. However, these units also produce an unacceptably high level of noise during operation. The other shortcoming of such cameras and battery powered advancing units is that the batteries must be periodically replaced. The "Great Wall" camera has the shortcoming that it must be wound by hand and it is possible that those responsible for operability of the system may forget to wind the unit, resulting in inoperability at a crucial time. Thus, there is a need for a reliable, low cost, low noise surveillance camera system capable of taking a timed sequence of photographs in response to a control signal.

SUMMARY OF THE INVENTION

Accordingly, it is an object of the invention to provide a low cost surveillance camera system for taking a timed sequence of photographs in response to a control signal.

It is another object of the invention to provide a reliable, low cost mechanism for advancing the film winding lever and activating the exposure button of a low cost camera to take a sequence of time-spaced photographs of a restricted area.

It is another object of the invention to provide a surveillance camera system for taking a timed sequence of photos of a restricted area with a sufficiently low level of noise to prevent detection of such noise by a person in the restricted area being photographed.

Briefly described, and in accordance with one embodiment thereof, the invention includes a mechanism for automatically advancing the film winding lever and depressing an exposure button of a camera having an exposure button collar attached to a surface of the camera and surrounding the exposure button. In a preferred embodiment of the invention, the camera is housed in an insulated enclosure having an opening permitting the lens to view the restricted area under surveillance. The mechanism includes a motor driven unit mounted within the insulated enclosure in fixed relationship to the camera and having a motor-driven shaft. The first element is rotatably connected to the exposure button collar, and has a rigid member for engaging the film winding lever during rotation of the first element in a counterclockwise direction through an angle sufficient to advance the film in the camera. The first element is then rotated in a counterclockwise direction to an initial position, permitting the film winding lever to return to an initial position. The rotation of the first element occurs in response to a second element coupled to the rotating shaft. In one embodiment of the invention, the second element includes a connecting arm hingably attached to the first element and also hingably attached to a crank arm rigidly connected to the rotating shaft. The mechanism includes an exposure button depressing element coupled to a connecting arm for depressing the exposure button during a predetermined portion of the counterclockwise rotation of the first element. In a presently preferred embodiment of the invention, the exposure button depressing element is a rigid member attached to the connecting arm and having a surface sloped with respect to the supporting surface of the camera to which the exposure button collar is attached. The first element includes a collar engaging member hingably attached to the first plate and having a substantially cylindrical chamber accommodating the exposure button and the exposure button collar and rigidly attached to the exposure button collar. A rod extends slidably through an opening in the collar engaging member to engage the exposure button. The rod is depressed during the counterclockwise rotation of the first element as the sloped surface moves toward the rod and engages it, thereby causing the shutter of the camera to be opened.

BRIEF DESCRIPTION OF THE DRAWINGS

FIG. 1 is a perspective view illustrating a camera surveillance system concealed in a speaker-like enclosure.

FIG. 2 is an exploded view of a motor-driven mechanism for automatically advancing a film winding lever and depressing the exposure button of the camera of FIG. 1.

FIG. 2A is an enlarged sectional view of element 42 of FIG. 2.

FIG. 3 shows a remote transmitter and a receiver for activating a transmitted signal to start a motor of the system of FIG. 1.

FIG. 4 shows a top view of the camera and advancing mechanism during counterclockwise rotation of the film winding lever.

FIG. 5 shows a top view of the camera and advancing mechanism at a point during the return motion of the film winding lever.

FIG. 6 shows a configuration of the advance mechanism approximately at the time that the film winding lever has returned to an initial position and the exposure button is depressed.

DESCRIPTION OF THE INVENTION

Referring now to the drawings, and particularly to FIG. 1, a detection sytem 10 encloses a camera 12 controlled by a control unit 14. Camera 12 can automatically take a sequence of time-spaced photographs when a start signal is received by control unit 14. Camera 12 is mounted on shelf 20, as is motorized unit 22. Plate 30 is bolted to the top of motorized unit 22 and engages the upper portion of camera 12 as shown in FIG. 1 to provide a rigid relationship between camera 12 and motorized unit 22. Shaft 26 and bearing 28 of motorized unit 22 extend through an opening in plate 30 to connect to advance mechanism 24, which, as subsequently explained, automatically advances film winding lever 32 of camera 12 and depresses an exposure button 36 of camera 12 when the film winding lever has returned to an initial position in response to rotation of shaft 26 of motorized unit 22.

The amount of time that shaft 26 rotates depends on the length of time that power is applied to motorized unit in response to control unit 14. This amount of time is established by setting control 14A on the face of control unit 14. Once a start signal is applied to control unit 14, control unit 14 then connects operating power to motorized unit 22 for the amount of time determined by the setting of control 14A. Thus, the number of time-spaced photographs taken by camera 12 is indirectly controlled by the setting of control 14A.

Referring now to FIG. 3, a radio receiver 80 is included in camera detection system 10. Remote transmitter 82 transmits a start signal in response to activation of a switch 82A. Receiver 80 receives the start signal and turns on control unit 14, causing the above-described time-spaced sequence of photographs to be taken automatically. Switch 82A may be a button-type switch activated, for example, by a clerk in a liquor store during an armed robbery. Or, switch 82 can be a "bill clip switch" concealed in a cash register; the bill clip can be set up to produce a switch closure signal when currency bills in the cash register are removed by a thief, thereby initiating the automatic taking of a sequence of photographs of the area "visible" to camera 12 through its lens.

It should be noted that the front of enclosure 16 is covered with a thin fabric 15 through which light from outside of enclosure 16 can pass into the lens of camera 12, but which conceals the contents of enclosure 16 from being observed by any person, namely, the person being "observed" by camera detection system 10.

It should also be noted that an insulation layer 18 is provided inside enclosure 16 to minimize the amount of noise made by motorized unit 22, advancing mechanism 32, and camera 12 during the automatic operation of the unit. However, as subsequently explained, the elements disclosed herein inherently operate with very little noise.

Referring now to FIG. 2, an exploded view of advance mechanism 24 is shown. Its relationship to exposure button 36 and exposure button collar 34 of camera 12 are also shown.

Camera 12 is a Ricoh model 35ZF in one embodiment of the invention. Control unit 14, in the presently preferred embodiment of the invention, is a sequencing unit, model CE410A, commercially available from CRIMEYE Inc., Phoenix, Ariz. Motorized unit 22 is a model T30RPM model manufactured by Hurst Inc., Princeton, Ind. As mentioned above, a receiver can be included in system 10 to operate in conjunction with a remote transmitter. A suitable receiver is the Model 615 receiver manufactured by Linear Corporation, Inglewood, Calif. A suitable remote transmitter, Model number 23, is also manufactured by Linear Corporation.

Referring now to FIG. 2, it is seen that exposure button 36 extends from upper surface 38 of camera 12 through collar 34. Collar 34 is firmly attached to upper surface 38 and serves as a mounting base for advance mechanism 24.

Mounting element 42, shown clearly in FIG. 2A, has a cylindrical chamber 42B which rigidly engages collar 34 and freely accommodates exposure button 36 and the lower end of exposure button pressing rod 40. Set screws 44 and 46 of mounting element are tightened to firmly engage collar 34. Mounting element 42 includes a cylindrical shaft 42A having a centrally disposed hole 48A extending from the top of shaft 42A into cylindrical chamber 42B for slidably accommodating rod 40. the lower end of rod 40 is flanged to prevent rod 40 from falling out of hole 48A during shipping of camera detection unit 10.

Plate 64 has an opening which accommodates shaft 42A of mounting element 42 such that plate 64 can freely swivel about rigidly mounted mounting member 42. Collar 48 fits over shaft 42A and is positioned to abut the upper surface of plate 64 so as to permit free swiveling of plate 64 on shaft 42A. Collar 48 is rigidly attached to shaft 42A by means of set screw 50.

The upper tip of rod 40 extends through hole 48A, as indicated. Mounting element 42 and collar 48 may, if necessary, have a flat edge thereof to accommodate film winding lever 32, depending on the distance between the pivotal end of film winding lever 32 and collar 34.

A cylindrical element 61 is rigidly attached to the lower surface of corner 64A of plate 64 for engaging flim winding lever 32, as indicated in FIGS. 4, 5, and 6. As can be seen from FIG. 2, plate 64 is triangular in shape, having three corners, including 64A, at which cylindrical element 66 is attached, 64C wherein a hole accommodating shaft 42A of mounting element 42 is located, and a third corner 64B, whereat a perpendicular bolt 56 extends from the upper surface of plate 64. Spacer 52 is positioned on bolt 66 against the upper surface of plate 64, and a cylindrical sleeve or bearing 54 is positioned on bolt 56 against spacer 52, which has a larger diameter than sleeve 54.

A connecting arm 63 includes adjustable end elements 66 and 60 and a rod 65. Connecting arm 63 serves as a connecting rod between sleeve or bearing element 54 of plate 64 and a crank arm 70 connected to shaft 26 of motorized unit 22. When shaft 26 rotates, crank arm 70 and connecting arm 63 cooperate to produce a repetitive oscillating, swiveling or pivoting of plate 64 about shaft 42A in the course of operation of advance mechanism 24. End element 60 is attached to rod 65 adjustably by means of set screw 59 (FIG. 5). End element 60 has an opening 62 which hingeably accommodates sleeve 54. Wing nut 58 is tightly threaded on bolt 56, so that it firmly engages the upper edge of sleeve 54. The height of sleeve 54 is such that end element 62 can freely rotate about sleeve 54.

Crank arm 70 includes an opening 76 at one end thereof for rigidly engaging shaft 26 of motorized unit 22. A second opening 72 is provided through the opposite end of crank arm 70. A bolt 74 having a sleeve 73 thereon extends through opening 72 with sufficient tolerance to permit free rotation. The upper edge of sleeve 73 abutts the lower surface of end element 66, and the extending portion of bolt 74 extends through hole 68 in end element 66 and abutts wing nut 76, which is securely tightened.

Exposure button depressing member 62B is attached to end element 60 means of set screws 60A and 60B. Button depressing element 62B has a bend therein, so that section 62A is bent downward at an angle from section 62C, as indicated in FIG. 2. The sloped lower surface of section 62A passes across the tip of rod 40 as rod 40 extends through opening 48A at approximately the end of the counterclockwise rotation of plate 64, as shown subsequently, and depresses the upper tip of rod 40, thereby depressing exposure button 36, after film winding lever 32 has returned to an initial position.

The operation of the advance mechanism of FIG. 2 is shown in FIGS. 4, 5, and 6. Arrow A in each of FIGS. 4, 5, and 6 indicates that crank arm 70 rotates counterclockwise. In FIG. 4, arrow B indicates that plate 64 is caused to rotate counterclockwise by connecting arm 63, whereby element 66 forces film winding lever 32 to also rotate in a counterclockwise direction, thereby advancing the film in camera 12.

In FIG. 5, crank arm 70 has rotated past the point at which plate 64 has attained its maximum counterclockwise rotation angle, thereby rotating film winding lever 32 to its maximum counterclockwise position, and has begun to cause plate 64 to rotate in the counterclockwise, as indicated by arrow C in FIG. 5. Film winding lever 32 is spring loaded, and therefore also rotates in a clockwise direction to "follow" element 61 at a rate determined by the clockwise rotation rate of plate 64. During the clockwise rotation of plate 64, the sloped lower surface of section 62A of exposure button depressing member 62 approaches the upper tip of rod 40.

Finally, slighty before plate 64 attains its maximum clockwise rotation angles, the lower surface of section 62A engages the tip of rod 40. The final increment of clockwise rotation of plate 64 causes rod 40 to be depressed sufficiently to depress exposure button 36 enough to activate the shutter of camera 12. Continued rotation of crank arm 70 produces counterclockwise rotation of plate 64. FIG. 6 shows the position of crank arm 70, rod 65 and plate 64 slightly after exposure button has been completely depressed. The lower surface of section 62A then moves away from rod 40 as plate 64 rotates counterclockwise, causing exposure button 36 to be released. The foregoing sequence is then repeated as crank arm 70 begins to make another revolution.

It should be noted that motorized unit 22 has a "slip-type" bearing which slips about shaft 26 if the countertorque resistance encountered by shaft 26 exceeds a certain level. Thus, if the last frame of the film in camera 12 is exposed before control unit 14 turns off motorized unit 22, the slip-type bearing or "clutch" will "slip" about shaft 26, even though the motor of motorized unit 22 continues to operate, thereby preventing damage to camera 12 or to the film therein.

It should also be noted that set screws 67 and/or 69 of end elements 66 and 60, respectively, can be utilized to adjust the length of connecting rod 60, 65, 66 to control the precise point at which the sloped lower surface of section 62A of exposure button depressing member 62 depresses exposure button 36 sufficiently to activate the shutter of camera 12.

I claim:

1. A mechanism for automatically advancing film and depressing an exposure button of a camera having a film winding lever and exposure button collar means attached to a surface of said camera, said exposure button extending through said exposure button collar means, said mechanism comprising in combination:
   a. motor means mounted in fixed relationship to said camera for rotating a shaft;
   b. first means, rotatably connected to said exposure button collar means, for engaging said film winding lever during rotation of said first means in a counterclockwise direction with respect to said surface through an angle sufficient to advance the film of said camera, said first means then rotating in a direction clockwise with respect to said suface to an initial position, causing said film winding lever to return to an initial position, said clockwise and said counterclockwise rotation occurring in response to and at a rate determined by said rotation of said shaft;
   c. Second means responsive to said rotation of said shaft for engaging said first means to produce said counterclockwise and clockwise rotation of said first means; and
   d. exposure button depressing means coupled to said second means for depressing said exposure button during said clockwise rotation of said first means in response to said second means.

2. The mechanism of claim 1 further including control means for energizing said motor means in response to activation of a switch to cause said shaft to rotate at a predetermined angular rate.

3. The mechanism of claim 1 wherein said first means includes:
   a. a plate having first and second opposed surfaces and further having hinge means extending from said first surface;
   b. means extending from the second surface and laterally spaced from said hinge means for engaging said film winding lever;
   c. third means hingeably connected to said plate having a substantially cylindrical chamber therein for accommodating said exposure button and said exposure button collar means to connect said first means to said exposure botton collar means, said third means having a like hole therein disposed in substantially vertical relationship to said first surface; and
   d. wherein said exposure button depressing means includes rod means disposed in said hole for depressing said exposure button in response to said second means.

4. The mechanism of claim 3 wherein said exposure button depressing means includes a third surface sloped with respect to said first surface for engaging said rod means during said clockwise rotation of said first means to depress said rod means after said film winding lever has been returned to a predetermined position.

5. The mechanism of claim 4 wherein said motor means includes means for slipping engagement to said shaft when a predetermined counter-torque is applied to said shaft by said second means.

6. The mechanism of claim 4 wherein said second means includes:
   a. crank means having a first point rigidly connected to said shaft and also having a second point spaced from said first point; and
   b. arm means hingably connected to said crank means at said second point and hingably connected to said hinge means of said plate.

7. The mechanism of claim 6 wherein said arm means is adjustable to allow adjustment of the point of rotation of said plate whereat said third surface depresses said rod means to depress said exposure button sufficiently to activate the shutter of said camera.

8. The mechanism of claim 6 wherein said switch is activated in response to a signal from a remote transmitter.

9. The mechanism of claim 7 wherein said sloped surface is a surface of a rigid metal strip attached to said arm means and moves laterally across an end of said rod means to depress said exposure button as said arm means moves laterally with respect to said rod means.

10. A mechanism for automatically advancing film and depressing an exposure button of a camera having a film winding lever, and an exposure button, said mechanism comprising in combination:
   a. a motor means mounted in fixed relationship to said camera for rotating a shaft;
   b. first means, rotatably connected to said camera for engaging said film winding lever during rotation of said first means in a counterclockwise direction through an angle sufficient to advance the film of said camera, said first means then rotating in a direction clockwise to an initial position, causing said film winding lever to return to an initial position, said clockwise and said counterclockwise rotation occurring in response to and at a rate determined by said rotation of said shaft;
   c. second means responsive to said rotation of said shaft for engaging said first means to produce said counterclockwise and clockwise rotation of said first means; and
   d. exposure button depressing means coupled to said second means for depressing said exposure button during said clockwise rotation of said first means in response to said second means.

* * * * *